United States Patent
Bethina et al.

(10) Patent No.: US 8,800,976 B2
(45) Date of Patent: Aug. 12, 2014

(54) FORE-AFT VIBRATION ISOLATOR

(75) Inventors: Raju Bethina, New Albany, OH (US);
Anurag Sharda, New Albany, OH (US);
Andrew Schultz, New Albany, OH (US)

(73) Assignee: CVG Management Corporation, New Albany, OH (US)

(*) Notice: Subject to any disclaimer, the term of this patent is extended or adjusted under 35 U.S.C. 154(b) by 451 days.

(21) Appl. No.: 13/011,421

(22) Filed: Jan. 21, 2011

(65) Prior Publication Data

US 2012/0187614 A1    Jul. 26, 2012

(51) Int. Cl.
*A47C 7/14*    (2006.01)

(52) U.S. Cl.
USPC ....... 267/131; 267/289; 267/179; 297/344.15

(58) Field of Classification Search
CPC ........ B60N 2/502; B60N 2/508; B60N 2/509; B60N 2/544; B60N 2/54; F16F 1/121; F16F 1/125
USPC ........ 267/70, 72, 140.11, 286, 289, 131, 166, 267/169, 170, 174; 297/344.15, 344.16, 297/344.17; 248/421
See application file for complete search history.

(56) References Cited

U.S. PATENT DOCUMENTS

| | | | | |
|---|---|---|---|---|
| 3,269,774 A | * | 8/1966 | Belthle et al. | 297/216.18 |
| 4,384,701 A | * | 5/1983 | Barley | 248/561 |
| 4,475,707 A | * | 10/1984 | Foster | 248/636 |
| 4,638,982 A | * | 1/1987 | Misher et al. | 267/131 |
| 5,014,960 A | * | 5/1991 | Kimura | 248/602 |
| 5,251,864 A | * | 10/1993 | Itou | 248/588 |
| 5,618,021 A | * | 4/1997 | Brodersen | 248/550 |
| 6,866,236 B2 | * | 3/2005 | Mullinix et al. | 248/421 |
| 2004/0159763 A1 | * | 8/2004 | Mullinix et al. | 248/421 |
| 2005/0156093 A1 | * | 7/2005 | Mullinix et al. | 248/421 |
| 2007/0295882 A1 | * | 12/2007 | Catton | 248/588 |
| 2009/0134557 A1 | * | 5/2009 | Spangler et al. | 267/131 |
| 2010/0102493 A1 | * | 4/2010 | Deml et al. | 267/140.11 |
| 2011/0024958 A1 | * | 2/2011 | Deml et al. | 267/131 |
| 2011/0226930 A1 | * | 9/2011 | Enns et al. | 248/569 |
| 2012/0025577 A1 | * | 2/2012 | Kolb | 297/344.13 |

OTHER PUBLICATIONS

The International Search Report and the Written Opinion of the International Searching Authority mailed May 1, 2012. PCT/US2012/021227 Form PCT/ISA/220.

* cited by examiner

*Primary Examiner* — Robert A Siconolfi
*Assistant Examiner* — Charles Poon
(74) *Attorney, Agent, or Firm* — Kegler Brown Hill & Ritter; James J. Pingor

(57) ABSTRACT

A vehicle seating system includes a top frame for mounting to a vehicle seat. The top frame has integral rails or channels with roller tracks at one end and vibration dampening systems at the other. An opposing pair of the roller tracks includes a vibratory dampening or regulation system that controls the amount of fore and aft travel of the top frame.

20 Claims, 5 Drawing Sheets

FORE-AFT VIBRATION ISOLATOR

FIELD OF THE INVENTION

The innovation relates to vehicle seats and more particularly to vehicle seating assemblies that isolate occupants from vibrations carried through the vehicle structure.

BACKGROUND

Commercial vehicles, such as long-haul trucks, often employ suspension systems which differ from passenger vehicles in their construction and response to vibration. Oftentimes, suspension systems in commercial vehicles are specially designed for the intended use of the commercial vehicle. Large trucks, for example, are designed for and capable of handling heavy loads which affects suspension design and performance. As a result, trade-offs arise between work capability of a commercial vehicle and an operator's comfort. Because the main purpose of the truck is to transport loads, the decision is usually made to favor the performance capability of the commercial vehicle in lieu of the operator's comfort.

As a result, operators or drivers of commercial vehicles, sometimes experience aggravated discomfort and fatigue arising from exposure to excessive vehicle vibrations. As a result, efforts have been, and continue to be, made to provide some sort of amelioration of vibration-induced problems. Because most commercial vehicles are only occupied by a driver, these vibration containment efforts are often associated with the seating for the driver, and less often directed to the other vehicle occupants. A goal of most vibration containment systems is to selectively absorb vibrational energy and to channel or dissipate unwanted energy away from the driver's anatomy.

Usually, vibrations arriving at a driver's seat bear directional characteristics, thus, improvements to seating designs take advantage of this fact by restricting seating improvements to a particular type of vibration characteristic. For example, many seating design improvements have been directed to enhancements in providing fore and aft (e.g., horizontally linear) isolation and vertical isolation. One design concern is to provide sufficient vibration isolation within the footprint and framework of existing seating components, for example, without significantly raising the height of an operator's seat which may require subsequent modification to a passenger's seat.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a vibratory isolation mechanism. In aspects, the innovation can be employed as a "fore-aft isolator" in vehicle seating, e.g., long-haul truck seats. In operation, the innovation employs spring compression forces to isolate fore-aft vibratory effects of a seating apparatus. For example, the fore-aft isolator of the innovation can be employed in the framing system operator (and occupant) seats of a long-haul truck.

In another aspect of the subject innovation a vibratory control is provided that enables a user to control or regulate an amount of fore-aft isolation. This regulatory device effectively can enable a user to restrict compression and/or length of control spring mechanisms.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
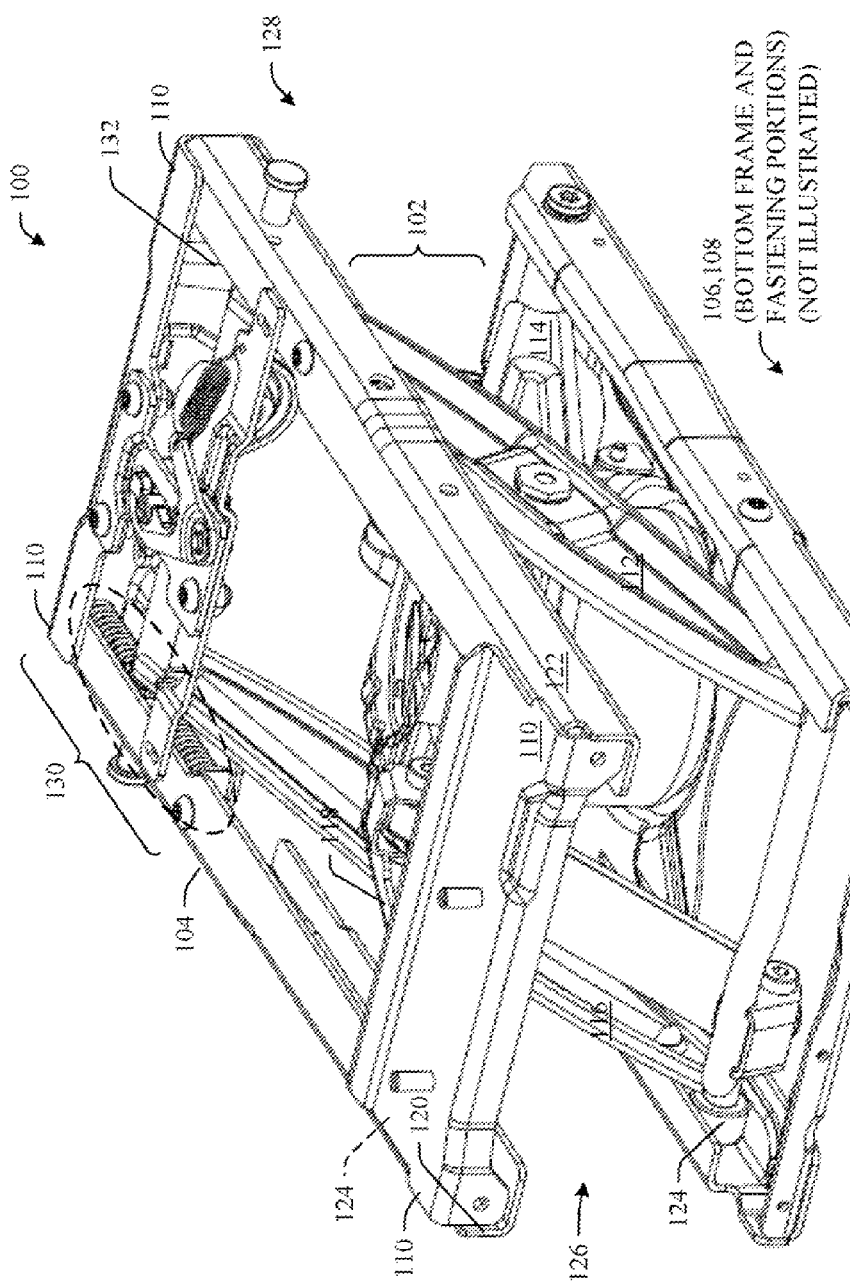
FIG. 1 illustrates a perspective view of an example seat support assembly in accordance with aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

In accordance with the innovation, vibratory isolation can be achieved by incorporating two compression mechanisms (e.g., springs) on either side of a seat assembly top suspension plate. The springs can be disposed within a channel formed on either side of the top suspension plate frame. As will be shown and described, the springs can be connected to shaft or crossmember via a connector block (e.g., plastic block) that would slide fore-aft (e.g., in linear motion) in the channel in synchronization with the seat assembly. Because the shaft is connected to the block between two competing springs, vibration will be dampened.

In aspects, the vibratory control mechanism can be locked by means of a latch, remotely activated by a cable. In a normal driving condition, the latch is most often in the "locked" or stationary condition. When "unlocked", the springs either compress in a forward or rearward direction, leading to the opposing spring to react in an opposite direction.

In operation, a seating assembly can be connected to (or incorporated within) the top plate of suspension system. Thus, once unlocked, the suspension top plate is free to move linearly on rollers in front and a plastic block (e.g., connector block) in rear. While specific materials are shown and described, it is to be understood that other aspects can employ other suitable materials without departing from the spirit and/or scope of the innovation. For example, the block need not be plastic but, can be manufactured of most any suitably rigid material (e.g., metal, wood, composite, etc.). Similarly, the connector block can be replaced with another connector mechanism while maintaining many of the features, functions and benefits described herein. These alternative aspects are to be included within the scope of the innovation and claims appended hereto.

Depending on spring stiffness, the seat natural frequency can be tuned to most any range desired, hence making this mechanism adjustable in terms of amount of isolation achieved. As will be understood and described infra, the blocks (e.g., plastic blocks) and stopper pins can be changed in length to achieve different stroke of isolation, thus making this mechanism adjustable in terms of amount of stroke achieved. It will be appreciated that the innovation can provide an efficient and cost effective way of achieving isolation, e.g., via fairly in-expensive components.

Referring initially to the drawings, FIG. 1 illustrates an example vehicle seating system generally indicated at 100. It is to be understood that FIG. 1 is included to provide context to the features, functions and benefits of the innovation. Thus, the components of FIG. 1 are not intended to limit the scope of the innovation in any manner.

As illustrated, seating system 100 includes a linking system or middle frame 102 that movably connects a top frame 104 to a bottom frame 106. Bottom frame 106 has portions 108 for conventional fastening to a vehicle. Top frame 104 has portions 110 for fixed connection to a vehicle seat assembly (not shown).

In accordance with the innovation, the vehicle seating system 100 can isolate a driver (or other occupant) from (or minimize effects of) vibrations which would otherwise be transmitted through the vehicle and ultimately to the vehicle occupants. In particular, the vehicle seating system 100 is capable of providing fore/aft isolation for those occupants seated in a seat apparatus (not shown) mounted atop the vehicle seating system 100. While FIG. 1 illustrates a multi-level seating system 100, it is to be understood that the fore-aft isolation features, functions and benefits described herein can be employed in connection with other seating systems without departing from the spirit and/or scope of this innovation and claims appended hereto. These alternatives are to be included within the scope of this specification and claims appended hereto.

It will be appreciated that, occupants who are subjected to fore/aft vibrations for prolonged periods of time often tend to become more quickly fatigued than if not exposed to these linear vibrations. One reason for the fatigue is a natural tendency of the human body to resist the effects of such vibrations which, in turn, cause the body to expend energy to compensate for the vibrations thereby becoming fatigued. Other long term effects can also arise as a result of long term exposure to these linear vibrations. As described herein, the innovation can isolate these vibrations by providing a fore/aft control.

Referring again to FIG. 1, the middle frame 102 can include two pairs of scissored arms, one pair of arms 112, 114 on the port or left side of the middle frame (see FIG. 1) and another pair of arms 116, 118 on the starboard or right-hand side of the middle frame. In this example, each scissor arm (112, 114, 116, 118) has opposed ends that slidably attach to a track or guide (120, 122) in the top frame 104.

In accordance with the innovation, rollers 124 can be employed at the forward end of the top frame 104, within one end of the tracks (120, 122). With continued reference to FIG. 1, for example, two rollers (124) are provided at the forward end (126) of the seating assembly and two vibratory compression mechanisms (not shown) can be provided at the rear end 128. The placement and operation of the vibratory compression mechanisms will be better understood upon a review of the figures that follow.

Referring again to FIG. 1, relatively straight guide tracks are provided for rollers (124) at the forward end 126 of the seating assembly 100. For example, top frame 104 provides straight or linear guide tracks 120, 122 for rollers 124 at the left and right sides, respectively. The reward portion (128) of the assembly 100 provides for vibratory compression mechanisms (not shown) disposed at 130 and 132.

Figure 2:
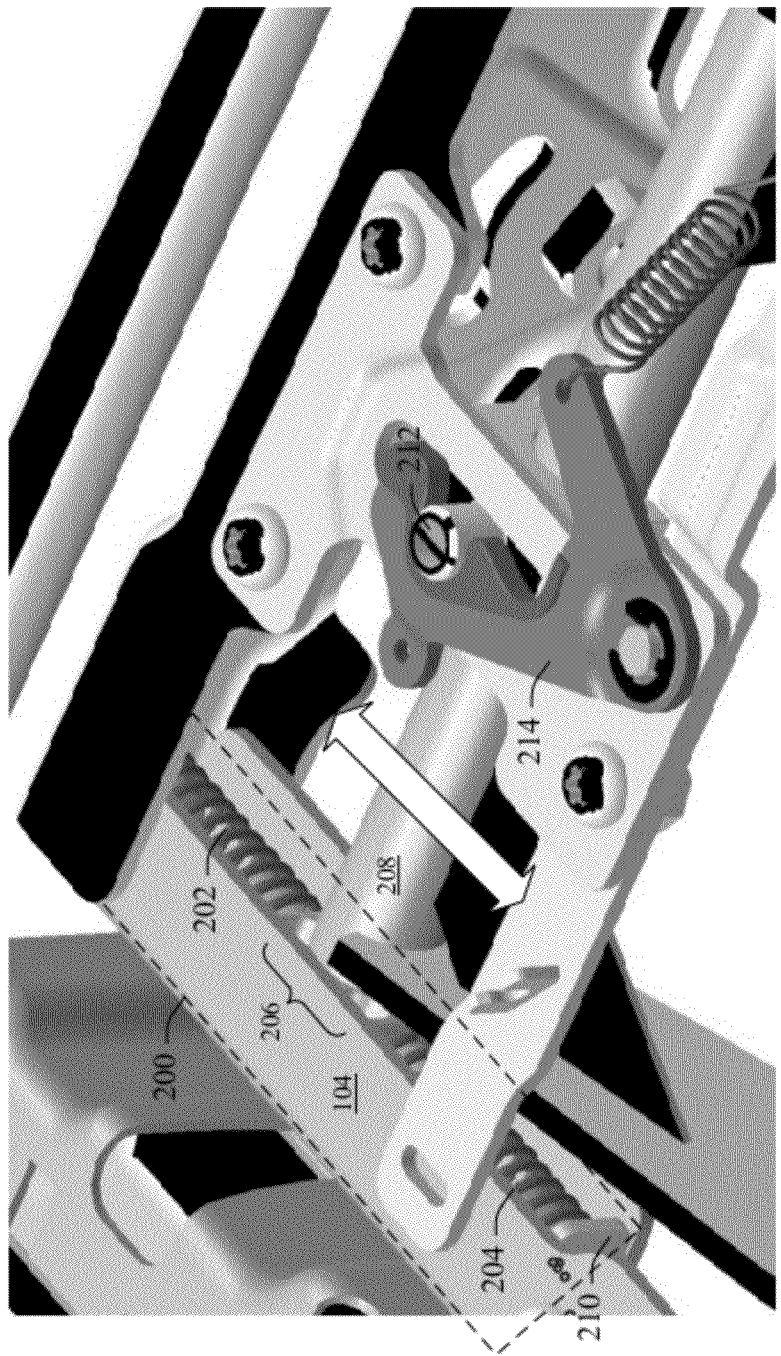
FIG. 2 illustrates an example vibratory control mechanism in accordance with an aspect of the innovation.

FIG. 2 illustrates an example view of a vibratory control mechanism 200 in accordance with an aspect of the innovation. As described supra, the control mechanism 200 can include two compression mechanisms (e.g., springs) 202, 204 and a connector block 206. In operation, a seat assembly can be mounted atop the middle frame support 208 that traverses within the track or rail of top support 104 as shown.

In order to compensate for or otherwise absorb fore-aft (linear) vibrations, the spring or compression mechanisms 202, 204 can expand and/or compress in synchronization so as to absorb competing vibrations or motions. As the seat assembly is mounted in a manner to linearly traverse with cross support 208, the fore-aft vibrations can be minimized or otherwise eliminated.

As cross support 208 linearly traverses back and forth (e.g., fore-aft), as indicated by the arrow in FIG. 2, the spring or compression mechanisms 202, 204 can compress and expand as appropriate to dampen vibrations. As will be better understood upon a review of the figures that follow, cross support 208 can be attached to connector block 206 such that, when one moves, the other traverses in synchronization. Although not shown in FIG. 2, it is to be understood that a second vibratory control mechanism 200 can be employed in a track in the top frame 104 opposite the one shown.

A stop 210 can be employed to retain compression mechanism 204 such that compression can be controlled. A similar stop can be employed on the aft end of the mechanism 200. In other aspects, the track (or guide) within the top frame 104 can be equipped with an end cap (not shown) that functions as a stop to constrain compression forces.

With continued reference to FIG. 2, as illustrated, in embodiments, cross-member 208 can be equipped with a stud or stop 212 that mechanically catches or locks into latching mechanism 214. As will be understood upon a review of the figures that follow, latching mechanism 214 can be operated by a cable or other release means so as to allow, or otherwise prevent, the fore-aft vibratory control mechanism 200 from traversing in a linear direction.

Figure 3:
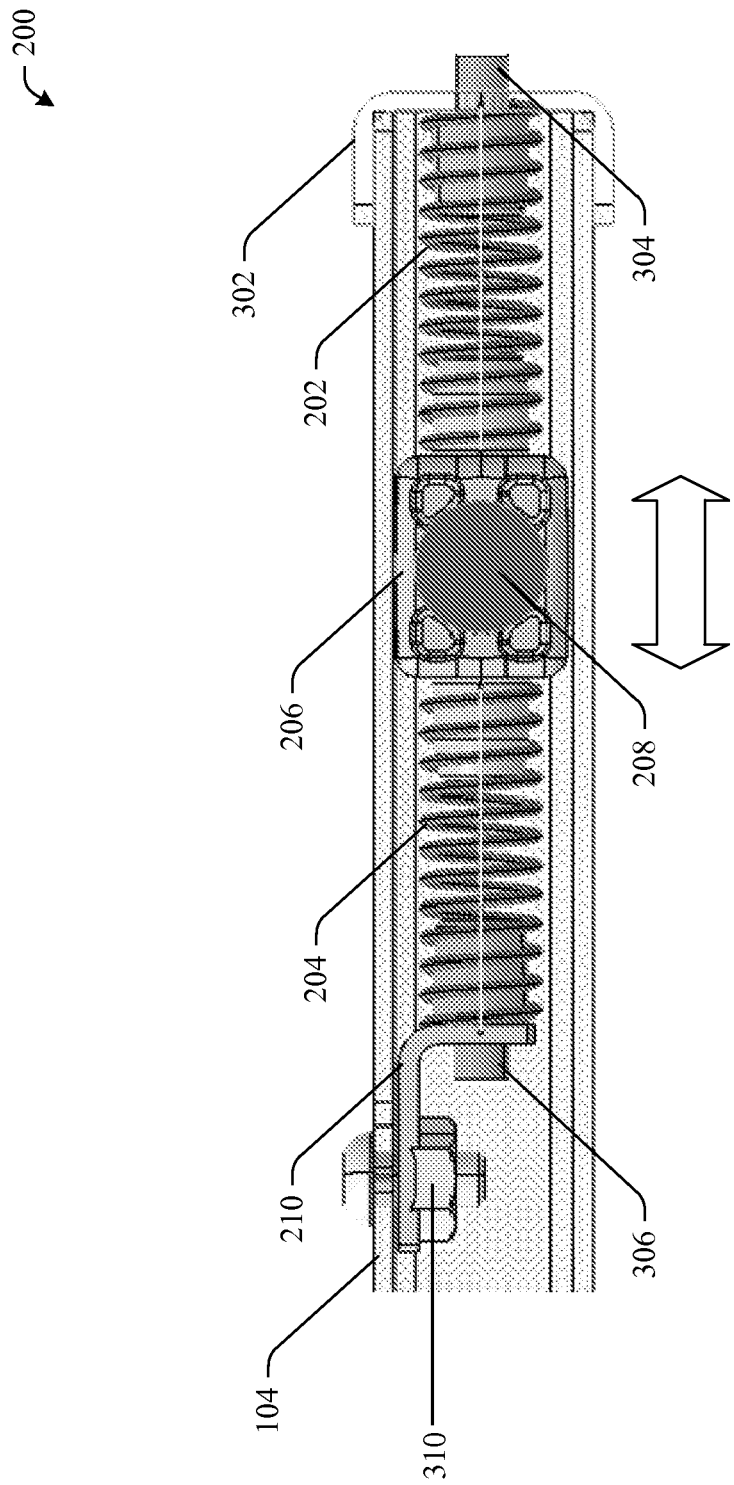
FIG. 3 illustrates a side view of a vibratory control mechanism in accordance with an aspect of the innovation.

Turning now to FIG. 3, a side view of vibratory control mechanism 200 is shown. While a single control mechanism 200 is shown and described, it is to be understood that, in most aspects, a pair of control mechanisms are used to control linear or fore-aft vibrations. Most any number of control mechanisms can be employed without departing from the spirit and/or scope of the innovation and claims appended hereto.

As illustrated, a connector component 206 is sizably configured to traverse within the rail of top surface 104. A cutaway view of the cross-member 208 is shown whereby the cross-member 208 can be inserted into (or about) the block 206 thereby facilitating synchronized motion of the block 206 together with the cross-member 208, which is connected to the seat assembly (not shown). Thus, vibrations that are transferred into the top surface 104 can be absorbed by the spring assemblies (202, 204) thereby isolating the cross-member 208 and seat assembly (not shown) from the vibrations.

In the aspect shown in FIG. 3, a stop can be provided on the fore side (210) as well as on the aft side (302) of the mechanism 200. It is to be understood that these stops (210, 302) can be separate components as shown or, alternatively, can be incorporated into (or integral to) the track of the top surface 104. These alternative aspects are to be included within the scope of this disclosure and claims appended hereto.

Alignment blocks 304, 306 can be employed to align the compression mechanisms 202, 204 respectively. In this aspect, each of the alignment blocks (304, 306) are configured with a male portion having an outer diameter that is sizably configured to fit into an interior diameter of each of the compression mechanisms 202, 204. Similarly, an opposite side of each of the alignment blocks 304, 306 can be equipped with a male portion having an outer diameter that is sizably configured to insert into (or through) each of the stop mechanisms 210, 304.

Although not shown, it is to be understood that stop 210 can be adjustable so as to increase or decrease compression and travel of each of the compression mechanisms 202, 204. In aspects, the nut/bolt combination 310 (as shown) can be linearly repositioned so as to provide adjustment of location of the stop 210. In other aspects, the alignment blocks 304, 306 can be equipped with adjustment means so as to restrict motion of the compression mechanism 202, 204. This adjustment capability can enable the vibratory control device 200 to be applicable to most any occupant weight or desired vibration control.

Figure 4:
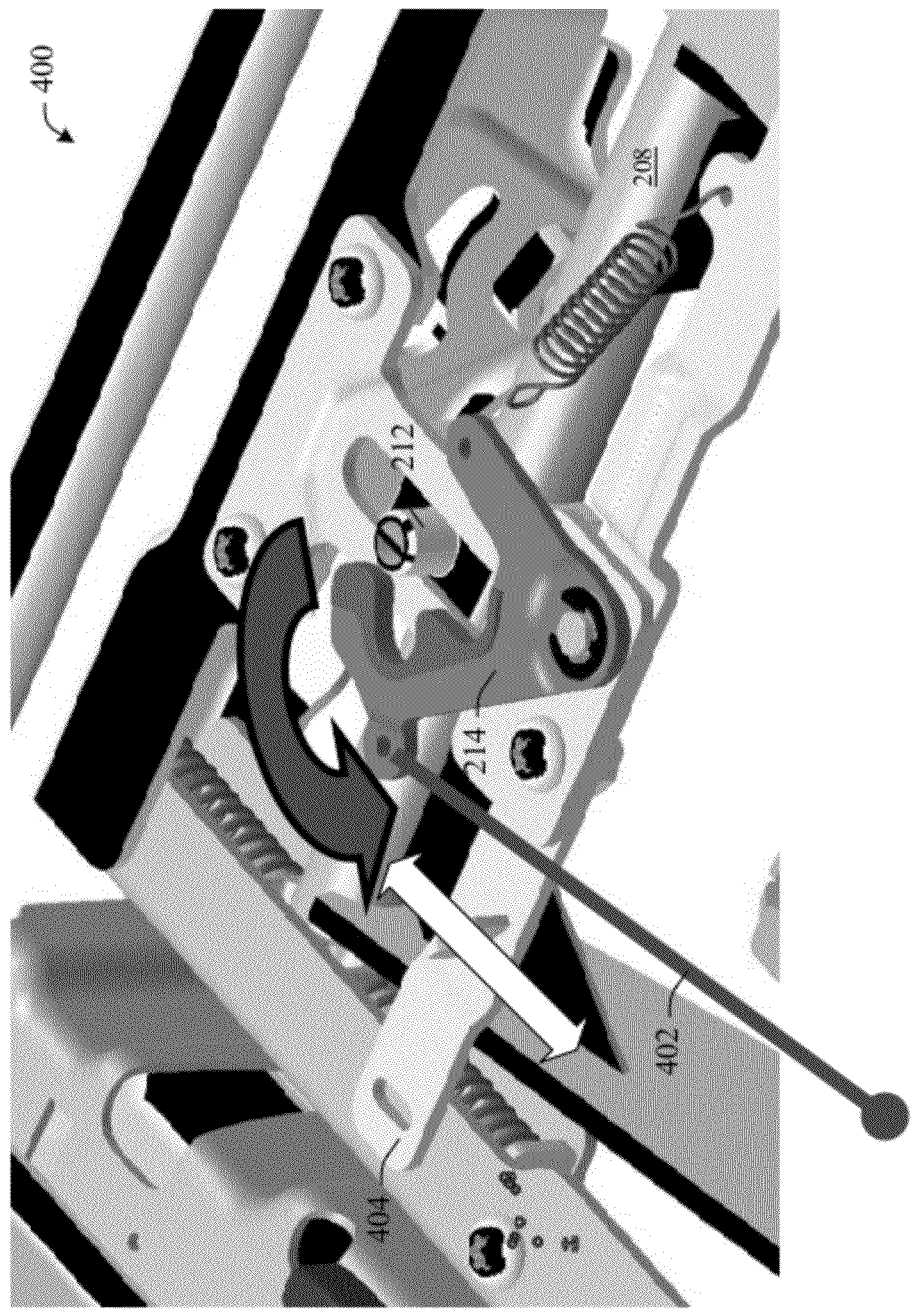
FIG. 4 illustrates an example latching mechanism in accordance with aspects of the innovation.

FIG. 4 illustrates an alternate aspect of a vibratory control system 400 in accordance with an aspect of the innovation. As shown, a cable or activation means 402 can be attached to the latching mechanism 214. Thus, in this example, upon pulling the activation means 402, the latching mechanism 214 can rotate in the direction of the arched arrow thereby releasing the latching mechanism 214 from the stop 212 integral (or fixedly attached) to the cross member 208. Similarly, when pushed, the latching mechanism 214 can be rotated in the opposite direction which captures (or attaches to) the stop post 212 thereby restricting travel of the cross-member 208 and seat assembly (not shown) attached thereto. It is to be understood that a seat assembly (not shown) can be attached so as to move in synchronization with the cross-member 208, for example, to attachment means 404. While a single attachment point 404 is shown, it is to be understood that multiple points can be employed without departing from the spirit and/or scope of the innovation and claims appended hereto.

Figure 5:
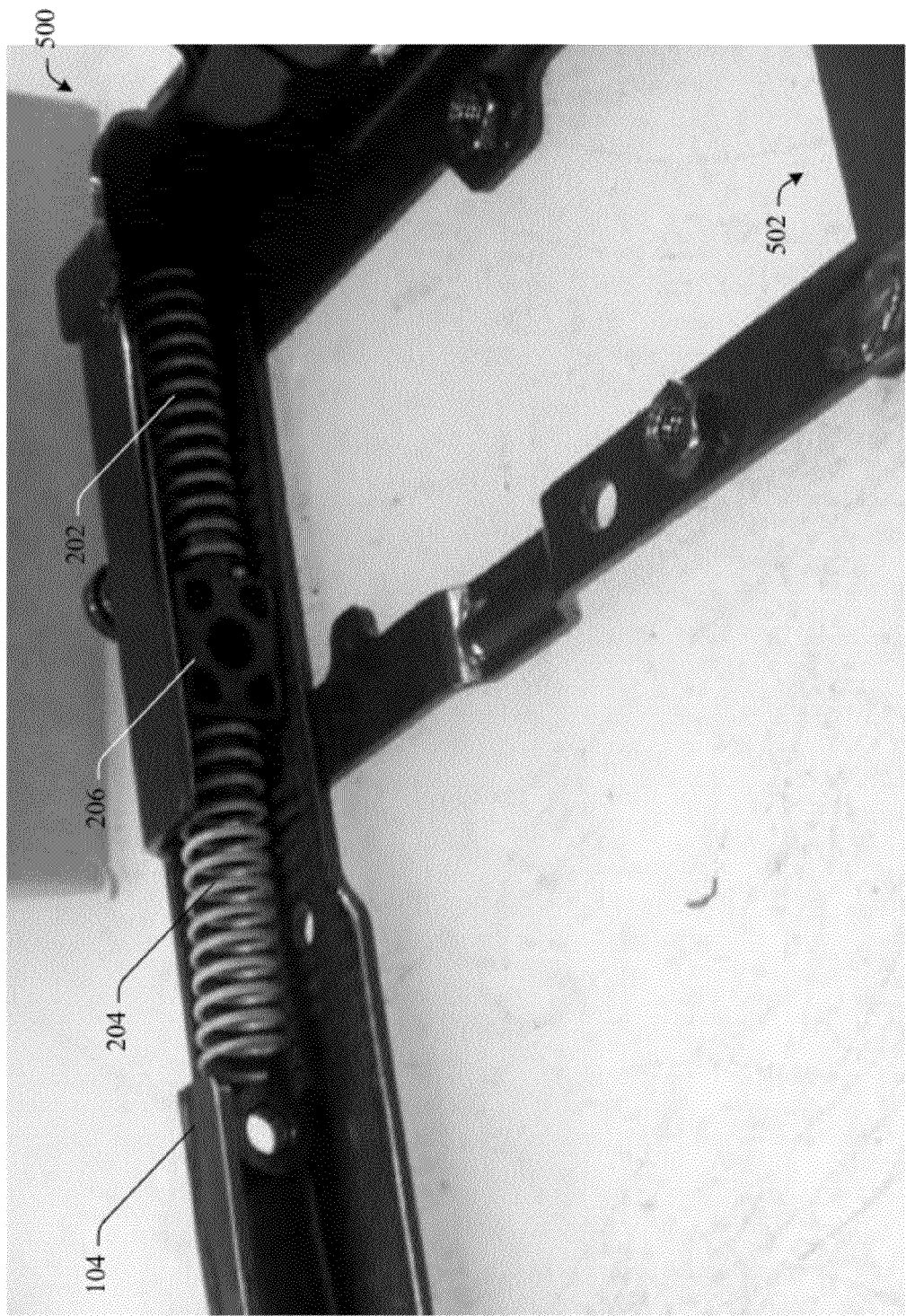
FIG. 5 illustrates an alternate view of a vibratory control mechanism disposed within a channel of a seat frame in accordance with aspects of the innovation.

Referring now to FIG. 5, an example placement of vibratory control mechanism 500 in accordance with aspects of the innovation. As described supra, the springs or compression mechanisms (202, 204) and connector block 206 can be positioned within the tracks of top surface 104. While a single system is shown in FIG. 5, it is to be understood that a second system can be positioned into the other track of top surface 104 as illustrated at 502. Still further, while each system employs two individual spring or compression mechanisms, it is to be understood that alternate aspects can employ a single compression mechanism in a system. These alternative systems are to be included within the scope of the specification described herein.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates vibratory dampening, comprising:
a connector block configured to fixedly connect to a cross-member, wherein the cross-member is in communication with a seat assembly, and wherein the connector block travels linearly within a channel of a seat mounting frame in synchronization with the seat assembly; and
a pair of compression mechanisms, each of the compression mechanisms having an inner and an outer end, wherein the inner end of each of the compression members is attached to opposite ends of the connector block:,
a pair of alignment mechanisms for aligning the pair of compression mechanisms and the connector block within the channel of the seat mounting frame, wherein the outer end of each compression member is attached to a respective alignment mechanism, wherein the connector block is attached to the alignment mechanisms only through the compression members, and wherein the connector block and the pair of compression mechanisms are configured to dampen linear vibration upon being installed within the channel of the seat mounting frame.

2. The system of claim 1, the linear vibrations are fore-aft vibrations.

3. The system of claim 1, wherein each of the compression mechanisms are coiled springs.

4. The system of claim 1, further comprising at least one stop that retains at the least one of the compression mechanism at a point opposite the connector block.

5. The system of claim 1, wherein each alignment mechanism includes a male portion partially extending into an interior of the outer end of each of the compression mechanisms, and wherein the alignment mechanisms are attached to the compression mechanisms only by the male portion.

6. The system of claim 1, further comprising an adjustment means that enables adjustment of at the at least one compression mechanism, wherein the adjustment means comprises a repositionable fastener and whereby the adjustment compensates for one of occupant weight or strength of vibration.

7. The system of claim 1, further comprising a second system that facilitates vibratory dampening, wherein the second system is positioned with a second channel that is opposite the channel, and wherein the second system is fixedly connected to the cross-member.

8. The system of claim 1, further comprising a latching mechanism configured to lock the vibratory dampening system in a stationary position.

9. The system of claim 8, further comprising a control mechanism that facilitates operation of the latching mechanism.

10. The system of claim 9, wherein the control mechanism is a cable that pivots the latching mechanism to at least one of engage or disengage the latching mechanism upon a post integral to the cross member.

11. A system that dampens fore-aft vibrations, comprising:
a seat assembly attached to a platform, wherein the platform includes at least one cross-member that traverses a width of the platform, and wherein the cross-member traverses in a linear direction within a track; and a coil assembly that dampens fore-aft vibrations transferring into the platform, wherein the coil assembly is fixedly attached to the cross-member and wherein the coil assembly includes i) a pair of spring mechanisms attached to a connector block positioned between the pair of spring mechanisms, and ii) a pair of alignment mechanisms that align the spring mechanisms within the track, wherein the connector block is attached to the alignment mechanisms only through the spring mechanisms.

12. The system of claim 11, further comprising a latching mechanism that one of locks or unlocks the cross-member to control linear motion of the cross member within the track.

13. The system of claim 12, further comprising a cable assembly that facilitates remote operation of the latching mechanism.

14. The system of claim 11, further comprising a stop mechanism and a repositionable fastener for adjusting tension of the coil assembly.

15. A method for controlling fore-aft vibrations in a seat assembly, comprising:

positioning a connector block in a channel of a seat mounting frame;

positioning a pair of spring mechanisms within the channel, wherein a first end of one spring mechanism is attached to one side of the connector block and a first end of the other spring mechanism is attached to the other side of the connector block;

aligning the pair of spring mechanisms and the connector block within the channel of the seat mounting frame, wherein a second end of one spring mechanism is attached to a first alignment mechanism and a second end of the other spring mechanism is attached to a second alignment mechanism, and wherein the connector block is attached to the alignment mechanisms only through the spring mechanisms;

attaching the connector block to a cross-member that moves in synchronization with the seat assembly on a parallel plane with the channel; and dampening the fore-aft vibrations via compensation of the pair of spring mechanisms.

16. The method of claim 15, further comprising adjusting compression of at least one of the pair of spring mechanisms.

17. The method of claim 15, further comprising selectively latching or unlatching a post that is connected to the cross-member, wherein the act of selectively unlatching permits linear motion of the cross-member.

18. The method of claim 15, wherein the act of selectively latching restricts linear motion of the cross-member.

19. The method of claim 15, further comprising one of limiting or adjusting travel distance of the connector block within the channel.

20. The system of claim 11, wherein each of the pair of alignment mechanisms that align the spring mechanisms within the track includes a male portion partially extending into an interior of each of the spring mechanisms, and wherein the alignment mechanisms are attached to the spring mechanisms only by the male portion.

* * * * *